United States Patent [19]

Armbrust et al.

[11] 4,297,058
[45] Oct. 27, 1981

[54] INDEXABLE CUTTING INSERT

[75] Inventors: William D. Armbrust, Greensburg; James F. McCreery, Latrobe, both of Pa.

[73] Assignee: Kennametal Inc., Latrobe, Pa.

[21] Appl. No.: 164,808

[22] Filed: Jun. 30, 1980

[51] Int. Cl.³ .............................................. B26D 1/00
[52] U.S. Cl. .................................... 407/113; 407/120
[58] Field of Search ....................... 407/113, 114, 120

[56] References Cited

U.S. PATENT DOCUMENTS

| | | | |
|---|---|---|---|
| 3,187,406 | 6/1965 | Franko | 407/113 |
| 3,229,349 | 1/1966 | Leksell | 407/113 |
| 3,271,842 | 9/1966 | Breuning | 407/114 |
| 3,588,977 | 6/1971 | Bellingham et al. | 407/113 |
| 3,716,900 | 2/1973 | Erkfritz | 407/114 |
| 3,821,836 | 7/1974 | Ohtsu | 407/114 |
| 3,842,470 | 10/1974 | Hertel | 407/114 |
| 3,934,319 | 1/1976 | Schuler | 407/113 |
| 3,955,259 | 5/1976 | Gustafsson | 407/113 |
| 4,086,016 | 4/1978 | Goeke | 407/114 |

OTHER PUBLICATIONS

"Bearing Lands and Negative Rakes Prolong Cutting Tool Life" by Mark W. Purser, American Machinist, Aug. 2, 1945, pp. 118-121.
Kennametal Dwg. XB-798-3-Insert for Special Caterpillar Boring Head.
Caterpillar 55° Profiling Insert.
"Changing to Skiving and Roller Burnishing"-Tooling & Production, Jan. 1980, pp. 82-84.

Primary Examiner—Harrison L. Hinson
Attorney, Agent, or Firm—Lawrence R. Burns

[57] ABSTRACT

This invention relates to an indexable broadnosing cutting insert for use in boring and broadnosing applications, especially where a floating type of boring head is required. This insert, preferably, has a triangular-like shape. Each side of this triangular-like shape actually being made of three angularly related faces: a forward lead clearance face, a middle clearance face and a rear relief face. The forward lead clearance face and the middle clearance face are joined to the top face of the insert by a narrow, vertical wiper face.

11 Claims, 6 Drawing Figures

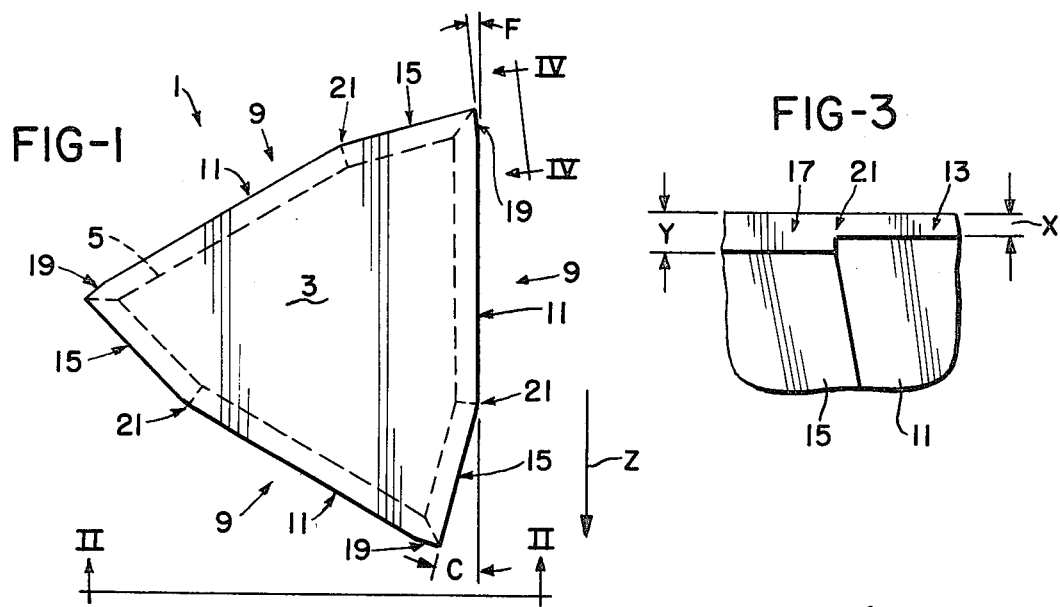
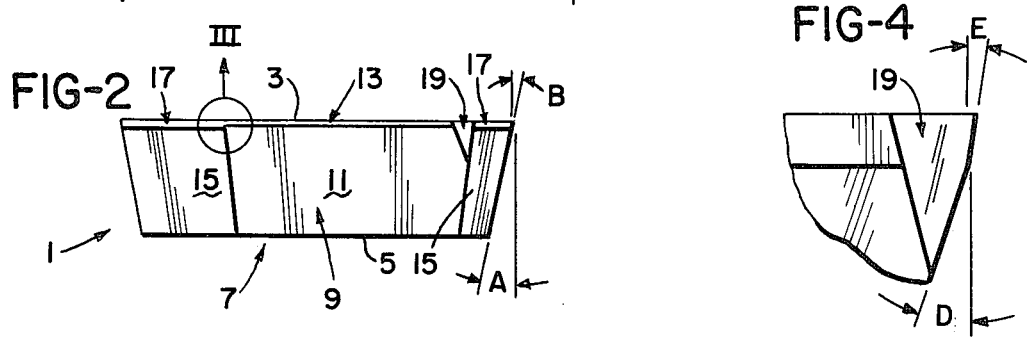
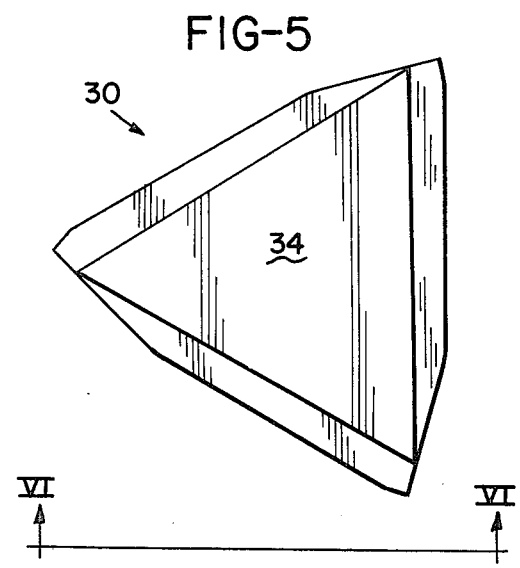

INDEXABLE CUTTING INSERT

BACKGROUND OF THE INVENTION

This invention relates to cutting inserts used in boring, especially those used in broadnosing (or skiving), and more specifically, those inserts used in broadnosing applications in which a floating head or floating cartridge is required. Cutting inserts used in these later applications require a cutting edge of superior strength to withstand the stresses produced by the high feed rates utilized.

In the past, a single edge, nonindexable cutting insert has been used in these floating broadnosing cartridges. These nonindexable cutting inserts require periodic resharpening in order to prolong their useful lives. However, each resharpening provides an opportunity for the introduction of defects, and insert to insert variations, in the cutting edge geometry. These defects and variations can reduce the cutting life of an insert, or cause a catastrophic insert failure while inside a workpiece, possibly damaging both the broadnosing cartridge and the workpiece.

Therefore, a particular object of this invention is to provide a broadnosing cutting insert having an improved cutting edge geometry.

Another object is to provide an indexable cutting insert for use in a floating broadnosing cartridge.

BRIEF SUMMARY OF THE INVENTION

According to the present invention, a polygonal, indexable cutting insert of a hard cemented carbide, or multicarbide, composition is provided, wherein each of the side walls joining the top and bottom faces of the insert is in actuality a group of angularly related faces. Each of these groups of faces includes a lead clearance face followed by an angularly related clearance face. Both faces are joined to the bottom face and slant upwardly and outwardly toward the top face.

The clearance face is followed by a substantially vertical rear relief face. Both clearance faces are joined to the top face by substantially vertical wiper faces. The junction of the wiper faces with the top face forms the cutting edges. The two wiper faces are joined to each other by a radius located approximately above the junction of the lead clearance face with the clearance face.

BRIEF DESCRIPTION OF THE DRAWINGS

The exact nature of the present invention will become more clearly apparent upon reference to the following detailed specification taken in connection with the accompanying drawings in which:

FIG. 1 is a top plan view of the indexable cutting insert according to the present invention.

FIG. 2 is the side view of the invention which would be seen when FIG. 1 is viewed along arrows II—II.

FIG. 3 is a partial enlargement of the FIG. 2 side view of the invention at the junction of the lead wiper, lead clearance, wiper and clearance faces.

FIG. 4 is a partial side view of the invention which would be seen when FIG. 1 is viewed along arrows IV—IV.

FIG. 5 is an alternate embodiment of the indexable cutting insert shown in FIGS. 1 through 4.

FIG. 6 is a side view of the invention shown in FIG. 5 viewed along arrows VI—VI.

DETAILED DESCRIPTION OF THE INVENTION

FIGS. 1 through 4 show an indexable polygonal cutting insert according to the present invention which is designed to be driven in a forward direction, shown by arrow Z in FIG. 1. This insert includes a top face 3, a bottom face 5, and a peripheral wall 7 joining said top 3 and bottom 5 faces.

The peripheral wall 7 is composed of a plurality of groups 9 of angularly related faces 11, 13, 15 and 17. These angularly related faces include a planar clearance face 11, a substantially vertical wiper face 13, a planar lead clearance face 15, a substantially vertical lead wiper face 17 and a rearward relief face 19.

The planar clearance face 11 joins the bottom face 5 and then obliquely slopes upward and outwardly toward the top face, forming an acute angle A with the vertical. Interposed between and joining said clearance face 11 to said top face 3 is a substantially vertical wiper face 13. The wiper face 13 can be inclined at an acute angle B to the vertical and has a height X.

Joining and located forward of said clearance face 11 is a planar lead clearance face 15. The planar lead clearance face 15 is inclined at an obliquely acute angle C forwardly and inwardly from the planar clearance face 11. This lead clearance face 15 also joins the bottom face 5 and obliquely slopes upward and outwardly toward the top face 3 at an acute angle D.

Interposed between and joining the lead clearance face 15 to the top face 3 is a substantially vertical lead wiper face 17. This lead wiper face 17 may be inclined at an acute angle E to the vertical and has a height Y. The lead wiper face is located forward of wiper face 13 and is inclined at an obliquely acute angle C forwardly and inwardly from the wiper face 13.

Located to the rear of wiper face 13 and clearance face 11 is a rear relief face 19. The rear relief face 19 joins the wiper face 13, the clearance face 11 and top face 3. The rear relief face 19 also slopes rearwardly and inwardly from the wiper face 13 at an angle F.

In its most preferred embodiment, this invention includes a convex radius 21 joining the lead wiper face 17 to wiper face 13. The convex radius 21 at this location serves to strengthen the cutting edge. In its preferred embodiment, the cutting insert 1 has angles A and D equal to 5 to 15 degrees. In its most preferred embodiment, these angles A and D are equal to 10 to 12 degrees or, nominally, 11 degrees.

Angles B and E, the angles the wiper faces form with the vertical, should be between zero to 5 degrees in the preferred embodiment, but they are always less than angles A and D and are, most preferably, zero or equal to the vertical.

Angle C, the lead angle, should be between 5 to 21 degrees, although it is preferred that this angle be between 14 to 20 degrees and, most preferably, 14 to 16 degrees or, nominally, 15 degrees. This angle C of the lead clearance and lead wiper faces serves to help locate the cutting insert in the bore that is to be machined and, also, serves to direct the chips cut forward of the cutting insert. The deeper the cut that is going to be made, the larger should be the angle C. However, more preferably, adjustment of the insert design to compensate for increased depths of cut can be achieved by holding the lead angle C constant, while increasing the length of the lead clearance face 15 and the lead wiper face 17.

Angle F, and end relief angle, may be from 2 to 10 degrees but, most preferably, it should be between 4 and 6 degrees or, nominally, 5 degrees.

Heights X and Y of the wiper face and the lead wiper face, respectively, should be between 0.005 and 0.015 of an inch in height. The heights of these wiper faces 17 and 13 need not be equal; however, it is preferred that they either be equal in height or, if they are to be unequal, that the wiper face 13 be narrower than the lead wiper face 17, wiper face 13 having a height, most preferably, in the range of 0.005 to 0.010 of an inch.

FIGS. 1 through 4 show an indexable polygonal cutting insert 1 without a chipbreaking structure on the top face 3. This is the preferred embodiment of this invention, since this allows for a replaceable chipbreaking structure to be loaded on the top face 3 when the cutting insert 1 is placed into the toolholders.

However, FIGS. 5 and 6 show an alternate embodiment of this invention in which there is a chipbreaking structure 34 as an integral part of the cutting insert 30.

Modifications may be made within the scope of the appended claims.

What is claimed is:

1. An indexable polygonal cutting insert designed to be driven in a forward direction comprising: a top face; a bottom face; a peripheral wall joining said top and bottom faces; said peripheral wall having a plurality of groups of angularly related faces; said angularly related faces within one of said groups having a planar clearance face adjoining said bottom face and obliquely sloping upwardly and outwardly at an acute angle, A; a substantially vertical wiper face, inclined at an acute angle, B, to a vertical plane and having a height, X, interposed between and joining said clearance face to said top face; a planar lead clearance face joining and located forward of said clearance face and inclined at an oblique acute angle, C, forwardly and inwardly from said planar clearance face; said lead clearance face adjoining said bottom face and obliquely sloping upwardly and outwardly at an acute angle, D; a substantially vertical lead wiper face, inclined at an acute angle, E, to a vertical plane and having a height, Y, interposed between and joining said lead clearance face to said top face; said lead wiper face located forward of said wiper face and inclined at an oblique acute angle, C, forwardly and inwardly from said wiper face; a rear relief face joining and located to the rear of said wiper and said clearance faces and joining said top face; and said rear relief face sloping rearwardly and inwardly from said wiper face at an angle, F.

2. An indexable polygonal cutting insert according to claim 1 further comprising a convex radius joining said lead wiper face to said wiper face.

3. An indexable polygonal cutting insert according to claim 1 wherein angles A and D equal 5 to 15 degrees; angles B and E equal zero to 5 degrees, but are always less than angles A and D; angle C equals 5 to 21 degrees; angle F equals 2 to 10 degrees; and heights X and Y equal 0.005 to 0.015 inch.

4. An indexable polygonal cutting insert designed to be driven in a forward direction according to claim 3 wherein angle C equals 14 to 20 degrees.

5. An indexable polygonal cutting insert designed to be driven in a forward direction according to claim 4 wherein angle C equals 14 to 16 degrees.

6. An indexable polygonal cutting insert designed to be driven in a forward direction according to claims 4 or 5 wherein angles B and E are zero.

7. An indexable polygonal cutting insert designed to be driven in a forward direction according to claim 6 wherein height X equals 0.005 to 0.010 inch.

8. An indexable polygonal cutting insert designed to be driven in a forward direction according to claim 7 wherein angles A and D equal 10 to 12 degrees.

9. An indexable polygonal cutting insert designed to be driven in a forward direction according to claim 8 wherein angle F is 4 to 6 degrees.

10. An indexable polygonal cutting insert designed to be driven in a forward direction according to claim 9 wherein said top face is free of any chipbreaking structures.

11. An indexable polygonal cutting insert designed to be driven in a forward direction according to claims 1 or 2 wherein said insert has a triangular-like appearance in said insert's top plan view.

* * * * *